(12) United States Patent
Uchimoto

(10) Patent No.: US 10,547,212 B2
(45) Date of Patent: Jan. 28, 2020

(54) WIRELESS POWER RECEIVER, CONTROL METHOD THEREOF, POWER RECEIVING CONTROL CIRCUIT, AND ELECTRONIC APPARATUS

(71) Applicant: ROHM CO., LTD., Ukyo-ku, Kyoto (JP)

(72) Inventor: Daisuke Uchimoto, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 138 days.

(21) Appl. No.: 15/804,548

(22) Filed: Nov. 6, 2017

(65) Prior Publication Data

US 2018/0131234 A1 May 10, 2018

(30) Foreign Application Priority Data

Nov. 8, 2016 (JP) .................... 2016-218232

(51) Int. Cl.
*H02J 50/12* (2016.01)
*G05F 1/46* (2006.01)
*H02M 7/04* (2006.01)

(52) U.S. Cl.
CPC ............... *H02J 50/12* (2016.02); *G05F 1/46* (2013.01); *H02M 7/04* (2013.01)

(58) Field of Classification Search
CPC .. H02J 50/12; H02J 50/80; H02J 50/90; H02J 50/20; H04B 5/0037; H04B 5/0031; H02M 7/04; G05F 1/46; G05F 1/44
USPC .............. 307/104, 149, 9.1, 10.1, 64, 66, 82
See application file for complete search history.

(56) References Cited

U.S. PATENT DOCUMENTS

| | | | |
|---|---|---|---|
| 2012/0313448 A1* | 12/2012 | Anttila | H02J 5/005 307/104 |
| 2013/0264961 A1* | 10/2013 | Chang | H04B 1/48 315/201 |
| 2014/0240383 A1* | 8/2014 | Penberth | H01L 41/042 347/10 |
| 2015/0341085 A1* | 11/2015 | Ettes | H04B 5/0031 307/104 |
| 2016/0043562 A1* | 2/2016 | Lisi | H02J 5/005 307/104 |
| 2017/0229911 A1* | 8/2017 | Ettes | H02J 5/005 |

(Continued)

FOREIGN PATENT DOCUMENTS

JP 2016119759 A 6/2016

*Primary Examiner* — Hal Kaplan
*Assistant Examiner* — Jagdeep S Dhillon
(74) *Attorney, Agent, or Firm* — Cantor Colburn LLP

(57) ABSTRACT

A wireless power receiver that receives a power signal from a wireless power transmitter includes: a receiving antenna including a receiving coil for receiving the power signal; a rectifying circuit configured to rectify an alternating current flowing through the receiving antenna; a smoothing capacitor configured to smooth an output of the rectifying circuit; an overvoltage detecting circuit configured to compare a rectified voltage generated in the smoothing capacitor with an overvoltage threshold; a modulator configured to change a parallel resonance frequency of the receiving antenna; and a discharging circuit configured to be switched between an enable state and a disable state and configured to enter the enable state during a communication period by the modulator to discharge the smoothing capacitor.

8 Claims, 8 Drawing Sheets

(56) References Cited

U.S. PATENT DOCUMENTS

2018/0205257 A1\* 7/2018 Kwon ..................... H05K 7/20
2018/0226834 A1\* 8/2018 Chen ........................ H02J 7/04

\* cited by examiner

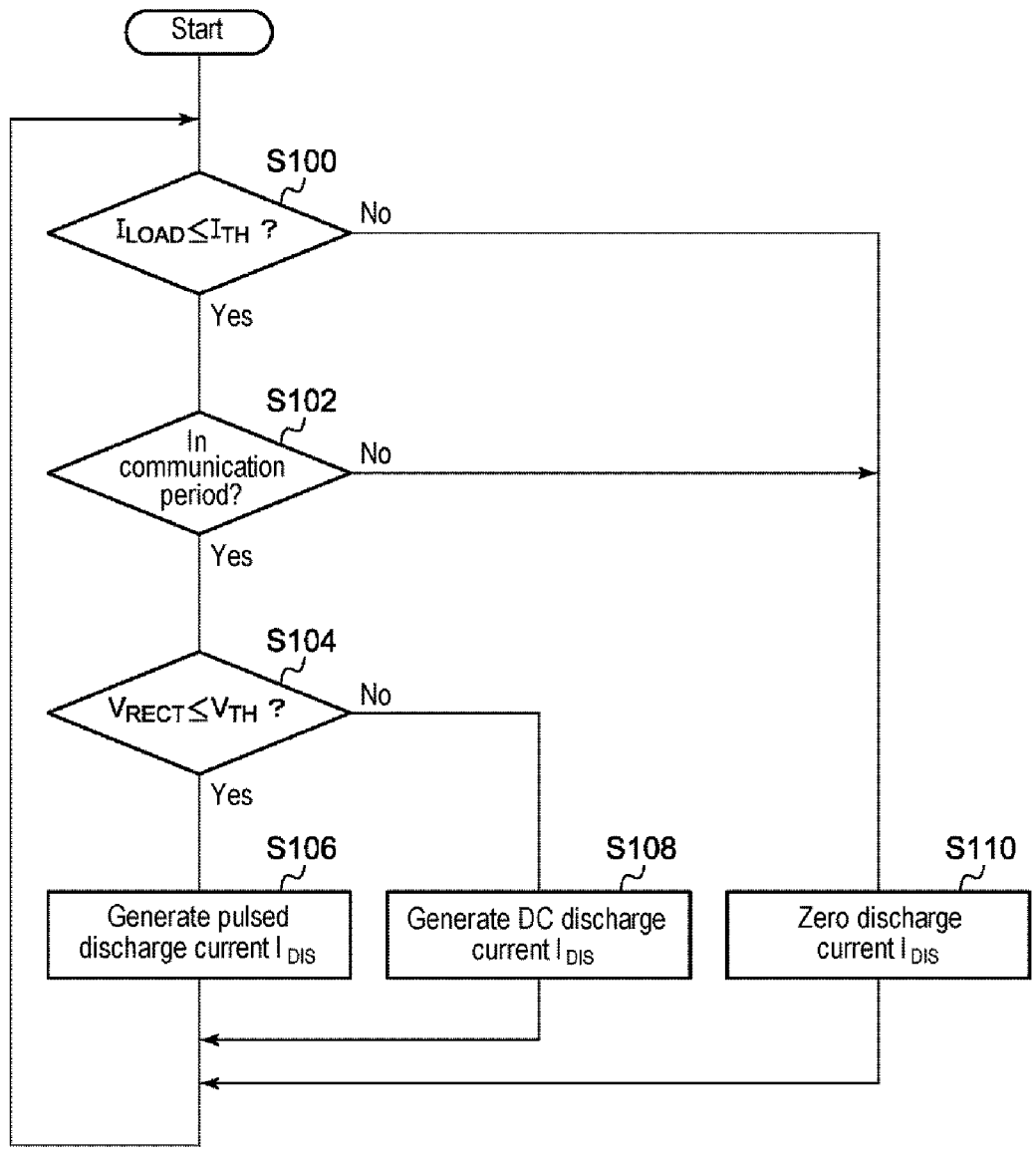

WIRELESS POWER RECEIVER, CONTROL METHOD THEREOF, POWER RECEIVING CONTROL CIRCUIT, AND ELECTRONIC APPARATUS

CROSS-REFERENCE TO RELATED APPLICATION

This application is based upon and claims the benefit of priority from Japanese Patent Application No. 2016-218232, filed on Nov. 8, 2016, the entire content of which are incorporated herein by reference.

TECHNICAL FIELD

The present disclosure relates to a wireless power feeding technique.

BACKGROUND

In recent years, non-contact power transmission (also referred to as contactless power feed or wireless power feed) has begun to spread to supply power to electronic apparatuses. WPC (Wireless Power Consortium) was organized to promote mutual use among products of different makers and the Qi standard as an international standard was formulated by WPC.

FIG. 1 is a view showing the configuration of a wireless power feed system 100 according to the Qi standard. The power feed system 100 includes a power transmitter (Tx) 200 and a power receiver (Rx) 300. The power receiver 300 is mounted on electronic apparatuses such as a mobile phone terminal, a smart phone, an audio player, a game machine, a tablet terminal and the like.

The power transmitter 200 includes a transmission antenna 201, an inverter 204, a controller 206, and a demodulator 208. The transmission antenna 201 includes a transmitting coil (primary coil) 202 and a resonance capacitor 203. The inverter 204 includes an H bridge circuit (full bridge circuit) or a half bridge circuit, applies a drive signal S1, specifically a pulse signal, to the transmitting coil 202, and generates an electromagnetic field power signal S2 in the transmitting coil 202 by a drive current flowing through the transmitting coil 202. The controller 206 generally controls the overall operation of the power transmitter 200. Specifically, the controller 206 changes transmission power by controlling the switching frequency, switching duty ratio and phase of the inverter 204 or the supply voltage $V_{DC}$ for the inverter 204. The controller 206 may be implemented by hardware such as a logic circuit or an FPGA (Field Programmable Gate Array) or may be implemented by a microcomputer and a combination of a CPU (Central Processing Unit) and a software program.

In the Qi standard, a communication protocol is defined between the power transmitter 200 and the power receiver 300 so as to allow control data S3 to be transferred from the power receiver 300 to the power transmitter 200. The control data S3 is transmitted from a receiving coil 302 (secondary coil) to the transmitting coil 202 in an AM (Amplitude Modulation)-modulated form by using backscatter modulation. The control data S3 includes, for example, power control data (also referred to as a packet) indicating the amount of supply of power to the power receiver 300, data indicating unique information of the power receiver 300, and the like. The demodulator 208 demodulates the control data S3 included in a current or voltage of the transmitting coil 202. The controller 206 controls the inverter 204 based on the power control data included in the demodulated control data S3.

The power receiver 300 includes the receiving coil 302, a rectifying circuit 304, a smoothing capacitor 306, a power supply circuit 308, a modulator 310, a demodulator 312, and a controller 314. The receiving coil 302 receives the power signal S2 from the transmitting coil 202 and transmits the control data S3 to the transmitting coil 202. The rectifying circuit 304 and the smoothing capacitor 306 rectify and smooth a current S4 induced in the receiving coil 302 in response to the power signal S2 and convert the induced current S4 into a DC voltage $V_{RECT}$. The power supply circuit 308 stabilizes the DC voltage $V_{RECT}$ and generates an output voltage $V_{OUT}$. The output voltage $V_{OUT}$ is supplied to a load circuit (not shown).

The controller 314 is, for example, a microcontroller or a CPU and executes a software program to support power feed conforming to the Qi standard. For example, the controller 314 monitors the power supply amount received by the power receiver 300 and generates power control data (control error value) indicating a power supply amount according to the monitored power supply amount. The modulator 310 changes a coil current and a coil voltage of the transmitting coil 202 by changing the parallel resonance frequency of a receiving antenna 301 based on the control data S3 including the power control data, and transmits information.

According to the Qi standard, control data S5 can be transferred from the power transmitter 200 to the power receiver 300. The control data S5 is superimposed on the power signal S2 by FSK (Frequency Shift Keying) and is transmitted from the transmitting coil 202 to the receiving coil 302. The control data S5 may include an acknowledge (ACK) signal, a non-acknowledge (NAK) signal and the like.

An FSK modulator 220 is incorporated in the controller 206 and changes the switching frequency of the inverter 204 according to data to be transmitted. The demodulator 312 of the power receiver 300 demodulates the FSK-processed control data (also referred to as an FSK signal) S5. The above is the configuration of the power feed system 100.

The rectifying circuit 304 of a synchronous rectification type is configured with a transistor. In this case, it is necessary to prevent the rectified voltage $V_{RECT}$ of a RECT pin (terminal) from exceeding the breakdown voltage of the transistor. To this end, an overvoltage protection circuit is provided. For example, when the breakdown voltage of the transistor is 20 V, an overvoltage threshold $V_{OVP}$ is set around 16 V and the protection works when the rectified voltage $V_{RECT}$ exceeds the overvoltage threshold $V_{OVP}$.

As a result of studies on this overvoltage protection, the present inventors have recognized the following problems. When the modulator 310 changes the parallel resonance frequency of the receiving antenna 301, the rectified voltage $V_{RECT}$ periodically jumps up accordingly.

The Qi standard was targeted to feed power of 5 W or less (low power) at the beginning of its formulation but was thereafter changed to a standard capable of feeding power of 5 to 15 W (medium power). In the low power, since the rectified voltage $V_{RECT}$ in the steady state is as low as 5 to 7 V, even when headroom for the overvoltage threshold $V_{OVP}$ (16 V) is sufficiently large and the rectified voltage $V_{RECT}$ jumps up due to the modulation of the modulator 310, the rectified voltage $V_{RECT}$ rarely exceeds the overvoltage threshold $V_{OVP}$.

On the other hand, in the medium power, since the rectified voltage $V_{RECT}$ in the steady state is higher (for example, about 12 to 14 V) than the low power, the headroom for the overvoltage threshold $V_{OVP}$ (16 V) becomes smaller. Therefore, when the rectified voltage $V_{RECT}$ jumps up due to the modulation of the modulator 310, it exceeds the overvoltage threshold $V_{OVP}$, making the operation unstable.

Such a problem may occur not only in the Qi standard but also in a power feed system conforming to or according to a standard formulated by PMA (Power Matters Alliance) (hereinafter referred to as a PMA standard).

SUMMARY

Some embodiments of the present disclosure provide a power receiver whose operation is stabilized.

According to one embodiment of the present disclosure, there is provided a wireless power receiver that receives a power signal from a wireless power transmitter. The wireless power receiver includes: a receiving antenna including a receiving coil for receiving the power signal; a rectifying circuit configured to rectify an alternating current flowing through the receiving antenna; a smoothing capacitor configured to smooth an output of the rectifying circuit; an overvoltage detecting circuit configured to compare a rectified voltage generated in the smoothing capacitor with an overvoltage threshold; a modulator configured to change a parallel resonance frequency of the receiving antenna; and a discharging circuit configured to be switched between an enable state and a disable state and configured to enter the enable state during a communication period by the modulator to discharge the smoothing capacitor.

According to the above embodiment, since the smoothing capacitor is discharged during an operation period of the modulator, it is possible to suppress jumping-up of the rectified voltage due to the modulation. Thus, it is possible to prevent circuit operation from being unstable due to malfunction of overvoltage protection.

The wireless power receiver may further include a main controller configured to control the modulator and the discharging circuit in association with each other. The main controller may be a microcontroller or a CPU.

The discharging circuit may intermittently generate a discharge current in the enable state. By generating the discharge current in an intermittent pulse type, the discharge amount cane be determined based on the on-time (duty ratio) of the discharge current.

The discharge current generated by the discharging circuit may be synchronized with a switching operation of the modulator. By generating the pulsed discharge current in accordance with a timing at which the pulsed current flows into the smoothing capacitor, the two currents cancel each other out to suppress the jumping-up of the rectified voltage more effectively.

The discharging circuit may constantly generate the discharge current when the rectified voltage exceeds a sub-threshold which is lower than the overvoltage threshold during the communication period by the modulator. By constantly generating the discharge current (i.e., by generating a DC discharge current), the effective amount of the discharge current can be increased. Thus, it is possible to certainly suppress rising of the rectified voltage.

The wireless power receiver may further include a power supply circuit configured to receive the rectified voltage generated in the smoothing capacitor, and the discharging circuit may enter the disable state when a current flowing through the power supply circuit is larger than a predetermined threshold. The jumping-up of the rectified voltage according to the switching of the modulator hardly causes a problem as the current flowing through the power supply circuit increases. In this situation, wasteful power consumption can be suppressed by causing the discharge circuit to enter the disable state.

The discharging circuit may include a discharge transistor interposed between an output terminal of the rectifying circuit and a ground. The discharge circuit can be switched between the enable state and the disable state according to the state of the discharge transistor. In addition, the discharge current of an intermittent pulse type can be generated by switching the discharge transistor.

The discharging circuit may further include a discharge resistor interposed between the output terminal of the rectifying circuit and the ground and connected in series with the discharge transistor. The discharge amount (discharge speed) can be determined based on a resistance of the discharge resistor.

The wireless power receiver may further include a clamp circuit configured to shift the parallel resonance frequency of the receiving antenna when the overvoltage detecting circuit detects an overvoltage state. With this configuration, it is possible to suppress rising of the rectified voltage.

The wireless power receiver may conform to at least one of the Qi standard and the PMA standard.

Another embodiment of the present disclosure relates to an electronic apparatus. The electronic apparatus may include any one of the wireless power receivers as described above.

According to another embodiment of the present disclosure, there is provided a power receiving control circuit for use in a wireless power receiver. The power receiving control circuit includes: a first AC input pin and a second AC input pin connected to a receiving antenna that receives a power signal from a wireless power transmitter; a rectification pin to which a smoothing capacitor is externally attached; a rectifying circuit having an input side connected to the first AC input pin and the second AC input pin and an output side connected to the rectification pin; an overvoltage detecting circuit configured to compare a rectified voltage of the rectification pin with an overvoltage threshold; a first communication pin connected to one end of the receiving antenna via an external capacitor; a second communication pin connected to the other end of the receiving antenna via another external capacitor; a first modulation transistor interposed between the first communication pin and a ground; a second modulation transistor interposed between the second communication pin and the ground; and a main controller configured to switch the first modulation transistor and the second modulation transistor so as to transmit a packet from the receiving antenna to the wireless power transmitter and configured to operate, in a transmission period of the packet, a discharging circuit interposed between the rectification pin and the ground so as to discharge the smoothing capacitor connected to the rectification pin.

The discharging circuit may include a discharge transistor installed outside the power receiving control circuit, and the power receiving control circuit may further include a control pin connected to a control terminal of the discharge transistor.

The power receiving control circuit may incorporate a discharge transistor constituting the discharging circuit. By incorporating the discharge transistor incorporated in the power receiving control circuit, it is possible to reduce the number of pins and the implementation area.

The discharging circuit may include a discharge resistor interposed between the rectification pin and the ground and connected in series with the discharge transistor.

The main controller may switch the discharge transistor in an operation period of the discharging circuit. The main controller may switch the discharge transistor in synchronization with the first modulation transistor and the second modulation transistor.

The main controller may constantly turn on the discharge transistor when the rectified voltage exceeds a sub-threshold lower than the overvoltage threshold during the transmission period of the packet.

The power receiving control circuit may further include an A/D converter configured to convert the rectified voltage into a digital value. The main controller may compare the digital value from the A/D converter with the sub-threshold value.

The power receiving control circuit may further include a power supply circuit configured to receive the rectified voltage of the rectification pin. The main controller may cause the discharging circuit to enter a disable state when a current flowing through the power supply circuit is larger than a predetermined threshold.

The power receiving control circuit may conform to at least one of the Qi standard and the PMA standard.

The power receiving control circuit may be integrated on a single semiconductor substrate. The expression "integrated" may include a case where all components of a circuit are formed on a semiconductor substrate and a case where main components are integrated while some resistors or capacitors for circuit constant adjustment or the like are installed outside the semiconductor substrate. By integrating the circuit on a single chip, it is possible to reduce the circuit area and maintain characteristics of circuit elements to be uniform.

Another embodiment of the present disclosure relates to a wireless power receiver. The wireless power receiver may include any one of the power receiving control circuits described above.

Further, arbitrarily combining the foregoing components or substituting the components or expressions of the present disclosure with one another among a method, an apparatus, and a system is also effective as an embodiment of the present disclosure.

BRIEF DESCRIPTION OF DRAWINGS

FIG. 5 is a flowchart of control of a discharging circuit in the power receiver.

DETAILED DESCRIPTION

Figure 1:
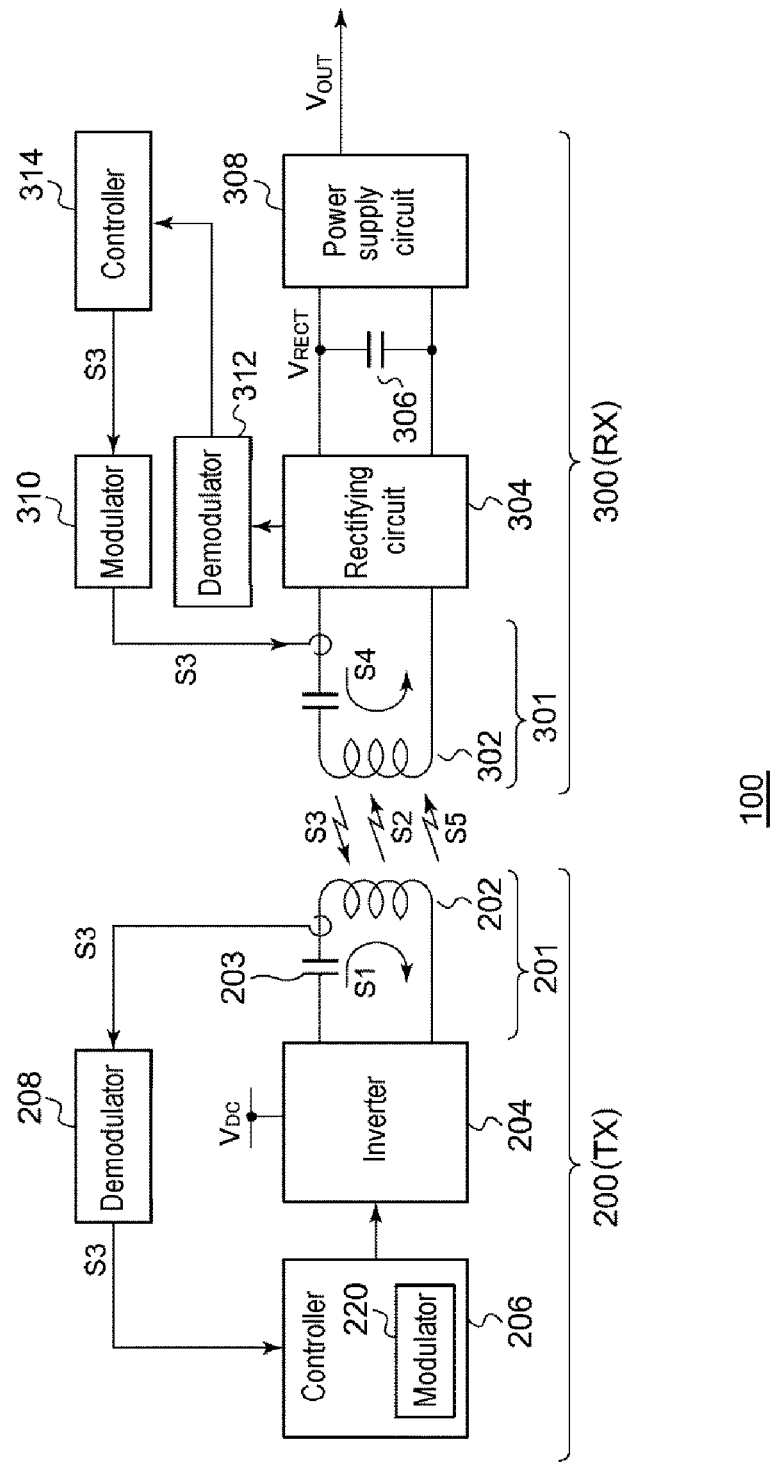
FIG. 1 is a view showing the configuration of a wireless power feed system according to the Qi standard.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or even a case where the member A and the member B are indirectly connected through any other member that does not affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not affect an electrical connection state between the members A and C or the members B and C or does not impair function and effects achieved by combinations of the members A and C or the members B and C, in addition to a case where the member A and the member C or the member B and the member C are directly connected.

Figure 2:
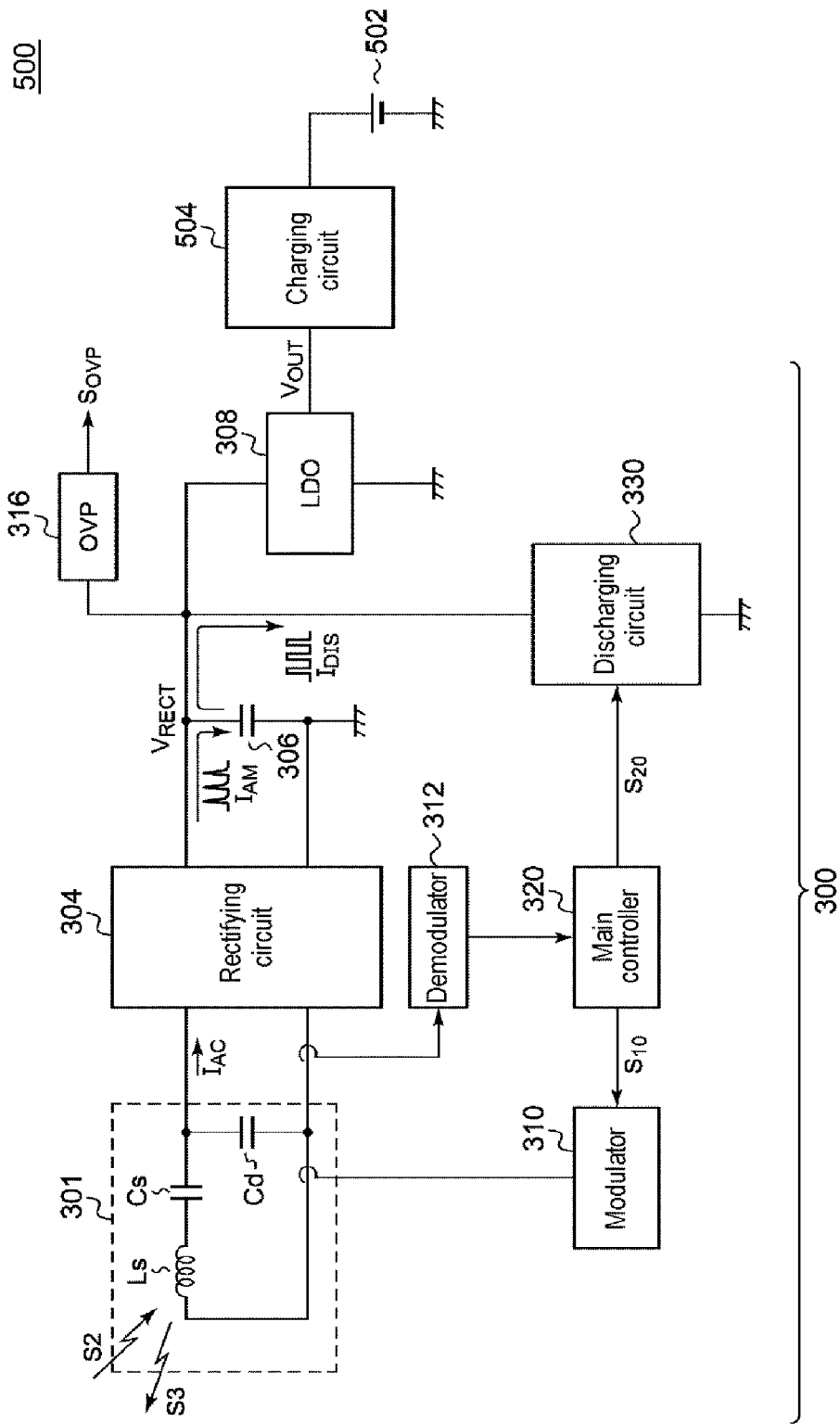
FIG. 2 is a circuit diagram of an electronic apparatus including a power receiver according to an embodiment.

FIG. 2 is a circuit diagram of an electronic apparatus 500 including a power receiver 300 according to an embodiment. The electronic apparatus 500 includes a rechargeable battery (secondary battery) 502 and a charging circuit 504 in addition to the power receiver 300. The power receiver 300 receives a power signal S2 from a power transmitter (not shown) and generates an output voltage $V_{OUT}$ stabilized to a predetermined voltage level. The charging circuit 504 receives the output voltage $V_{OUT}$ and charges the battery 502. The battery 502 is exemplified by, but not limited to, a lithium ion battery, a lithium ion polymer battery, a nickel hydrogen battery, a nickel cadmium battery or the like.

The power receiver 300 mainly includes a receiving antenna 301, a rectifying circuit 304, a smoothing capacitor 306, a power supply circuit 308, a modulator 310, a demodulator 312, an overvoltage detecting circuit 316, a main controller 320, and a discharging circuit 330.

The receiving antenna 301 includes a receiving coil Ls, a series resonance capacitor Cs, and a parallel resonance capacitor Cd. Both ends of the receiving antenna 301 are connected to the input side of the rectifying circuit 304. The rectifying circuit 304 performs full-wave rectification on a current $I_{AC}$ flowing through the receiving antenna 301 and supplies it to the smoothing capacitor 306. The power supply circuit 308 receives a DC voltage (rectified voltage $V_{RECT}$) generated in the smoothing capacitor 306 and generates the output voltage $V_{OUT}$ stabilized to the predetermined voltage level.

The modulator 310 is an AM modulator that shifts the parallel resonance frequency of the receiving antenna 301. The demodulator 312 is an FSK demodulator that detects the frequency of the power signal S2 based on a voltage across the receiving antenna 301.

The main controller 320 is a microcontroller or a CPU whose main function is to process various signals concerning the Qi standard and/or the PMA standard. The functions of the main controller 320 include (i) calculation of reception power of the power receiver 300, (ii) generation of a control error (CE) packet indicating an error between the rectified voltage $V_{RECT}$ and a desired point (DP), (iii) generation of an AM modulation signal $S_{10}$ for controlling the modulator 310, and the like.

The overvoltage detecting circuit 316 compares the rectified voltage $V_{RECT}$ with an overvoltage threshold $V_{OVP}$. When an overvoltage state ($V_{RECT} > V_{OVP}$) is detected, an overvoltage detection signal $S_{OVP}$ is asserted (for example, high level) and an overvoltage protecting process is performed to suppress rising of the rectified voltage $V_{RECT}$.

The discharging circuit 330 is connected to one end of the smoothing capacitor 306. The discharging circuit 330 can be switched between an enable state and a disable state and discharges the smoothing capacitor 306 in the enable state.

The main controller 320 generates a control signal $S_{20}$ for switching the discharging circuit 330 between the enable state and the disable state. Specifically, the main controller 320 puts the discharging circuit 330 in the enable state during a communication period by the modulator 310 and discharges the smoothing capacitor 306 with a discharge current $I_{DIS}$ flowing through the discharging circuit 330.

The above is the configuration of the power receiver 300. Next, operation of the power receiver 300 will be explained. For the purpose of clarifying the effect of the power receiver 300 of FIG. 2, operation of a conventional power receiver will first be described.

Figure 3A:
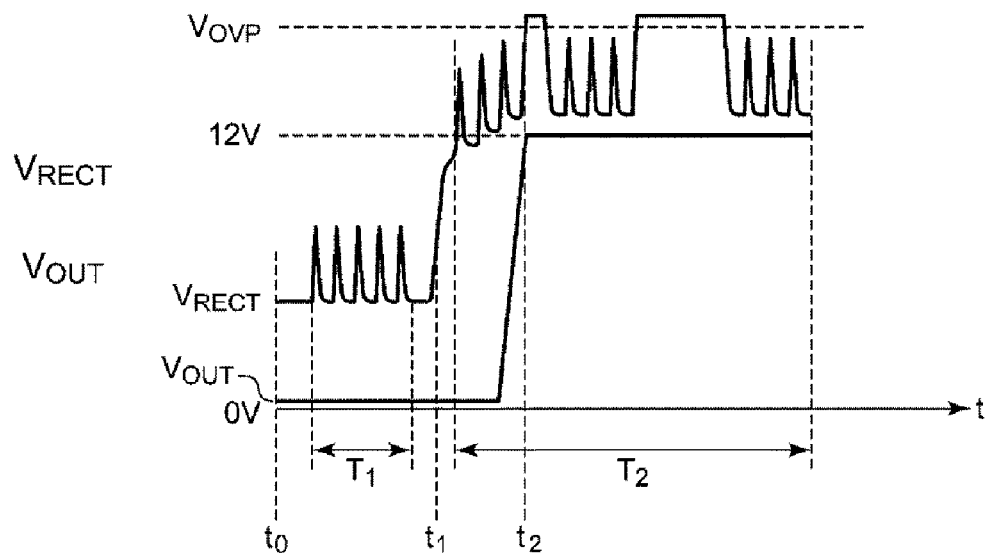
FIG. 3A is an operation waveform diagram of a conventional power receiver.

FIG. 3A is an operation waveform diagram of a conventional power receiver. In the operation waveform diagram, a vertical axis and a horizontal axis are enlarged and reduced appropriately for easy understanding and each waveform shown is also simplified, exaggerated or emphasized for easy understanding.

During a period from time $t_0$ to $t_1$, the power supply circuit 308 is stopped and the output voltage $V_{OUT}$ is around 0 V. At this time, the rectified voltage $V_{RECT}$ is stabilized to be a target voltage of about 5 V. In a communication period $T_1$ in which the modulator 310 operates, the rectified voltage $V_{RECT}$ greatly jumps up with the switching of the resonance frequency of the receiving antenna 301. However, the rectified voltage $V_{RECT}$ maintains a range lower than the overvoltage threshold $V_{OVP}$ and no overvoltage protection is applied.

At time $t_1$, the desired point of the rectified voltage $V_{RECT}$ rises. When the rectified voltage $V_{RECT}$ reaches a voltage level higher than 12 V, the operation of the power supply circuit 308 starts at time $t_2$ and the output voltage $V_{OUT}$ is stabilized at 12 V.

Here, in a communication period $T_2$, when the rectified voltage $V_{RECT}$ jumps up, it exceeds the overvoltage threshold $V_{OVP}$ and overvoltage protection is applied. When the overvoltage protection is applied, AM modulation is not applied and the communication becomes impossible, thereby making the circuit operation unstable.

Figure 3B:
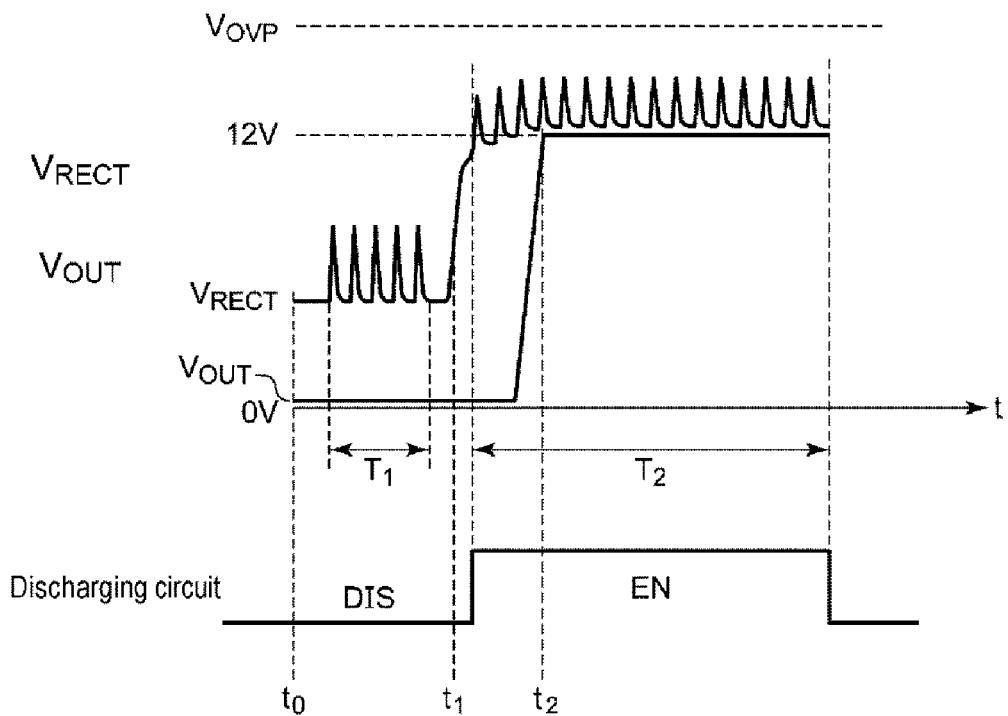
FIGS. 3B and 3C are operation waveform diagrams of the power receiver of FIG. 2.

Next, the operation of the power receiver 300 of FIG. 2 will be described. FIG. 3B is an operation waveform diagram of the power receiver 300 in FIG. 2.

During a period from time $t_0$ to $t_1$, the power supply circuit 308 is stopped and the output voltage $V_{OUT}$ is around 0V. At this time, the rectified voltage $V_{RECT}$ is stabilized to be a target voltage of about 5 V. In a communication period $T_1$ by AM modulation, the rectified voltage $V_{RECT}$ greatly jumps up with the switching of the resonance frequency of the receiving antenna 301.

At time $t_1$, the desired point of the rectified voltage $V_{RECT}$ rises. When the rectified voltage $V_{RECT}$ reaches a voltage level higher than 12 V, the operation of the power supply circuit 308 starts at time $t_2$ and the output voltage $V_{OUT}$ is stabilized at 12 V.

The jumping-up of the rectified voltage $V_{RECT}$ in a communication period $T_2$ is caused by a pulsed current excessively supplied from the rectifying circuit 304 to the smoothing capacitor 306. Therefore, in this communication period $T_2$, the discharging circuit 330 is in an enable state EN. Accordingly, an excessive current flowing into the smoothing capacitor 306 flows to the discharging circuit 330. As a result, it is possible to prevent the rectified voltage $V_{RECT}$ from jumping-up and exceeding the overvoltage threshold $V_{OVP}$.

In the period from time $t_0$ to $t_1$, in a state in which the baseline of the rectified voltage $V_{RECT}$ is as low as about 5 V, the peak of the rectified voltage $V_{RECT}$ maintains a range lower than the overvoltage threshold $V_{OVP}$ even in the event of the communication period $T_1$. Therefore, the discharging circuit 330 may be put in the disable state DIS regardless of the communication period $T_1$ during the period from time $t_0$ to $t_1$. Thereby, it is possible to prevent power from being wastefully consumed in the discharging circuit 330.

The discharging circuit 330 generates an intermittent discharge current $I_{DIS}$ in the enable state. This makes it possible to change the effective amount of the discharge current $I_{DIS}$ according to the duty ratio of the discharge current $I_{DIS}$.

Figure 3C:
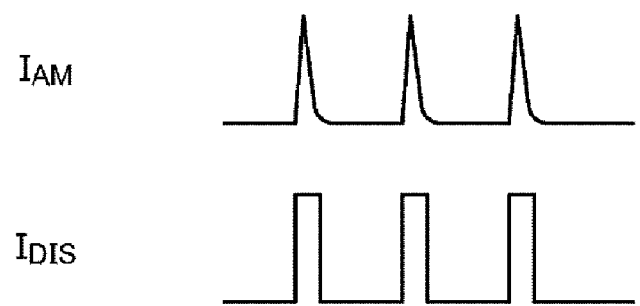

As an example, the discharge current $I_{DIS}$ generated by the discharging circuit 330 may be synchronized with the switching operation of the modulator 310. FIG. 3C is a waveform diagram showing a current $I_{AM}$ resulting from the AM modulation and the discharge current $I_{DIS}$. The pulsed current $I_{AM}$ is generated by the switching of the modulator 310. By generating the pulsed discharge current $I_{DIS}$ in accordance with a timing at which the pulsed current $I_{AM}$ flows into the smoothing capacitor 306, the pulsed current $I_{AM}$ and the pulsed discharge current $I_{DIS}$ cancel each other out to suppress the jumping-up of the rectified voltage $V_{RECT}$ more effectively.

Furthermore, since the main controller 320 can generate the control signal $S_{20}$ of the discharging circuit 330 based on the AM modulation signal $S_{10}$, there is also an advantage of simplified control.

Figure 4A:
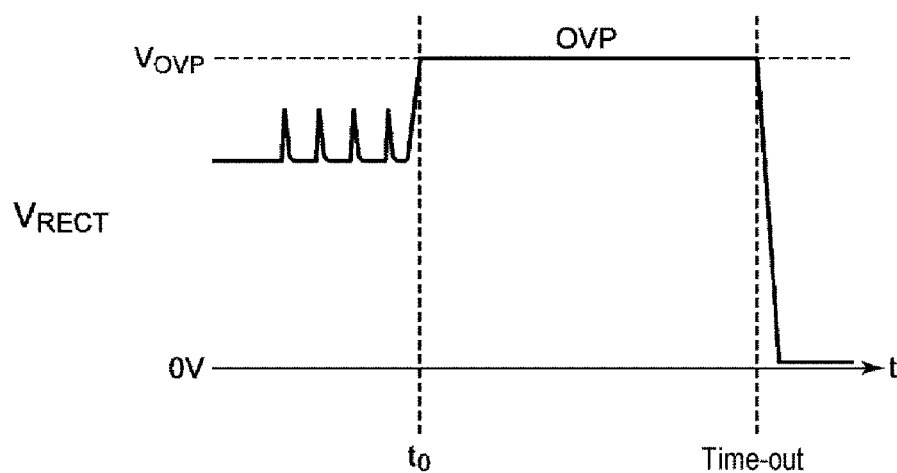
FIG. 4A is a view for explaining another problem occurring in the power receiver.

Subsequently, further features of the power receiver 300 will be described. FIG. 4A is a view for explaining another problem occurring in the power receiver. Even when the discharging circuit 330 is in the enable state during the communication period by the main controller 320, the rectified voltage $V_{RECT}$ still may exceed the overvoltage threshold $V_{OVP}$. When such a situation occurs, since the AM modulation is impossible, the control data S3 cannot be transmitted from the power receiver 300 to the power transmitter and a timeout occurs on the power transmitter side to stop the power feeding. When the power feeding is stopped, the rectified voltage $V_{RFCT}$ becomes zero.

In order to solve this problem, a sub-threshold $V_{TH}$ lower than the overvoltage threshold $V_{OVP}$ is defined. For example, when $V_{OVP}$ is 16 V, $V_{TH}$ may be about 13 V.

Figure 4B:
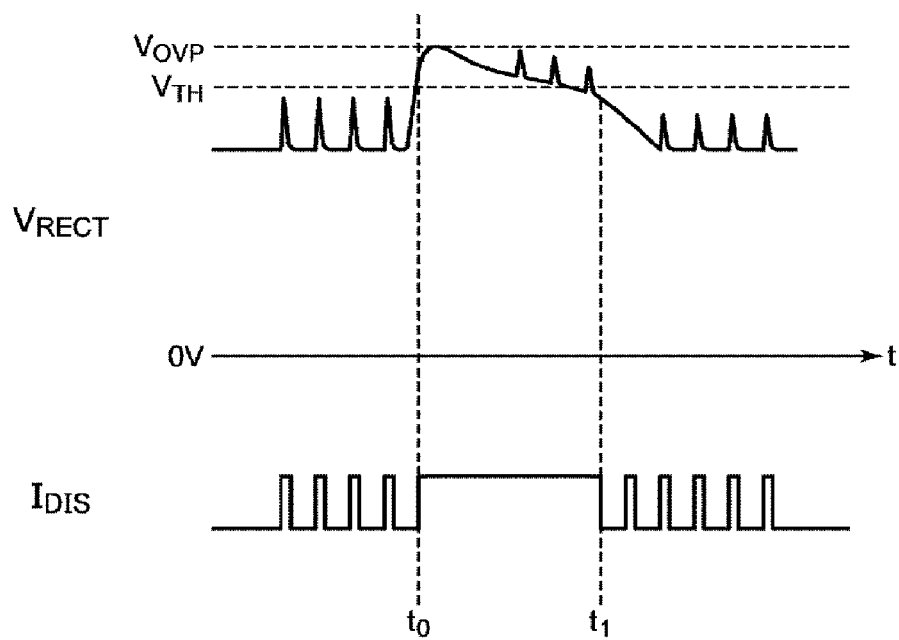
FIG. 4B is an operation waveform diagram of the power receiver according to the embodiment.

The discharging circuit 330 constantly generates the discharge current $I_{DIS}$ when the rectified voltage $V_{RECT}$ exceeds the sub-threshold $V_{TH}$ during the communication period by the modulator 310. FIG. 4B is an operation waveform diagram of the power receiver 300 according to the embodiment. Before time $t_0$, the pulsed discharge current $I_{DIS}$ is generated in synchronization with the AM modulation. When the rectified voltage $V_{RECT}$ rises at time $t_0$ and exceeds the sub-threshold $V_{TH}$, the discharge current $I_{DIS}$ is switched to a direct current (with the duty ratio of 100%). As a result, the smoothing capacitor 306 is discharged with a large current to lower the rectified voltage $V_{RECT}$. When the rectified voltage $V_{RECT}$ is equal to or falls below the sub-threshold $V_{TH}$ at time $t_1$, the intermittent discharge current $I_{DIS}$ synchronized with the AM modulation is generated.

By this process, since the control packet S3 can be transmitted to the power transmitter before the timeout on the power transmitter side, power feeding stop can be prevented.

In a state where a large load current $I_{LOAD}$ is supplied from the smoothing capacitor 306 to the power supply circuit 308, the influence of the current $I_{AM}$ according to the AM modulation becomes small and an overvoltage state of $V_{RECT} > V_{OVP}$ hardly occurs even when the discharging circuit 330 is in the disable state. Therefore, when the current $I_{LOAD}$ flowing through the power supply circuit 308 is larger than a predetermined threshold $I_{TH}$, the discharging circuit 330 may be put in the disable state even during the communication period. As a result, wasteful power consumption by the discharging circuit 330 can be suppressed. The load current $I_{LOAD}$ can be detected based on an input current or output current of the power supply circuit 308.

FIG. 5 is a flowchart of control of the discharging circuit 330 in the power receiver 300. When $I_{LOAD} > I_{TH}$ in step S100 (No in S100), the discharging circuit 330 is disabled and the discharge current $I_{DIS}$ is zero (S110).

When $I_{LOAD} \leq I_{TH}$ (Yes in S100), it is determined whether or not the power receiver 300 is in a communication period (S102). When the power receiver 300 is not in the communication period (No in S102), the discharging circuit 330 enters the disable state where the discharge current is zero (S110).

When the power receiver 300 is in the communication period (Yes in S102), the discharging circuit 330 enters the enable state. When $V_{RECT} \leq V_{TH}$ (Yes in S104), the pulsed discharge current $I_{DIS}$ synchronized with the AM modulation is generated. When $V_{RECT} > V_{TH}$ (No in S104), a fixed DC discharge current $I_{DIS}$ is generated (S108).

The order of steps in the flowchart of FIG. 5 may be changed unless contradictory or troublesome.

The present disclosure extends to various devices, circuits and methods as grasped from the circuit diagram of FIG. 2 or derived from the above description and is not limited to specific configurations. The following is a more specific example of configuration and an example for helping to understand and manifest the idea of the present disclosure and a circuit operation, without narrowing the scope of the present disclosure.

Figure 6:
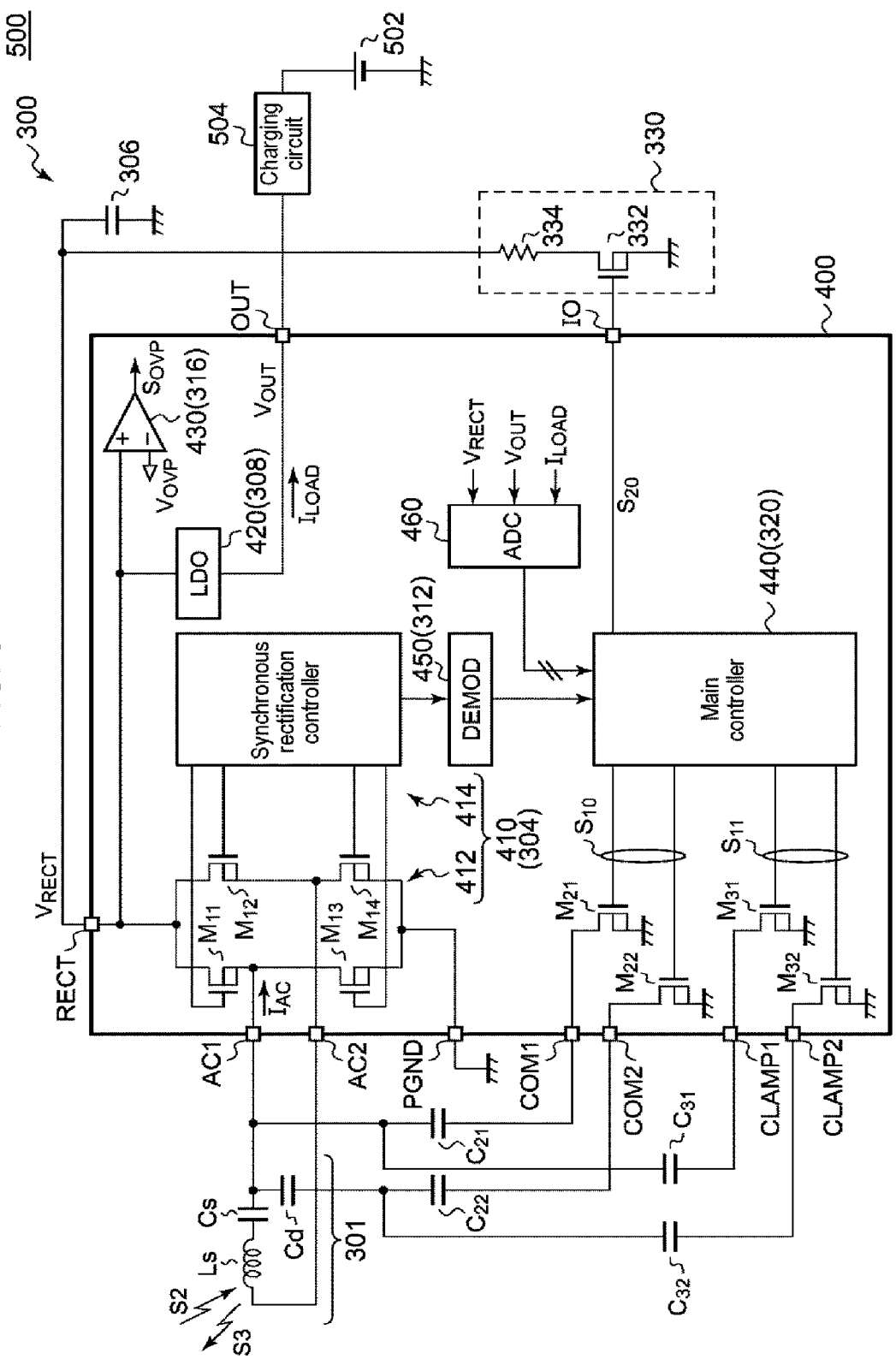
FIG. 6 is a view showing a specific configuration example of the power receiver.

FIG. 6 is a view showing a specific configuration example of the power receiver 300. The power receiver 300 includes a receiving antenna 301, a smoothing capacitor 306, a discharging circuit 330, and a reception control IC 400. The reception control IC 400 is a functional IC (Integrated Circuit) in which the rectifying circuit 304, the power supply circuit 308, the modulator 310, the demodulator 312, the overvoltage detecting circuit 316, and the main controller 320 shown in FIG. 2 are integrated.

Both ends of the receiving antenna 301 are connected to a first AC (AC1) pin and a second AC (AC2) pin of the reception control IC 400. The smoothing capacitor 306 having a large capacitance is connected to a rectification (RECT) pin of the reception control IC 400.

The reception control IC 400 includes a rectifying circuit 410, a power supply circuit 420, an overvoltage detecting circuit 430, a main controller 440, a demodulation circuit 450, and an A/D converter 460.

The input side of the rectifying circuit 410 is connected to the receiving antenna 301 via the AC1 pin and the AC2 pin and its output side is connected to the smoothing capacitor 306 via the RECT pin. The rectifying circuit 410 rectifies an alternating current $I_{AC}$ flowing through the receiving antenna 301 and supplies it to the smoothing capacitor 306. The rectifying circuit 410 corresponds to the rectifying circuit 304 in FIG. 2.

In the present embodiment, the rectifying circuit 410 is a synchronous rectifying circuit and includes an H bridge circuit 412 and a synchronous rectification controller 414. The synchronous rectification controller 414 controls four transistors $M_{11}$ to $M_{14}$ of the H bridge circuit 412 in synchronization with the alternating current $I_{AC}$. The H bridge circuit 412 may be formed outside the reception control IC 400 using discrete elements.

The demodulation circuit 450 corresponds to the demodulator 312 in FIG. 2 and demodulates an FSK signal superimposed on the power signal S2 based on voltages occurring at the AC1 pin and the AC2 pin. A well-known technique may be used for the configuration and control method of the synchronous rectification controller 414 and the demodulation circuit 450.

The power supply circuit 420 receives a rectified voltage $V_{RECT}$ of the RECT pin, stabilizes the rectified voltage $V_{RECT}$ to a predetermined voltage level, and outputs the stabilized voltage from an OUT pin. The power supply circuit 420 corresponds to the power supply circuit 308 in FIG. 2. At the low power of the Qi standard, the rectified voltage $V_{RECT}$ can be set to about 5 V and, at the medium power of the Qi standard, the rectified voltage $V_{RECT}$ can be set to about 12 V. The power supply circuit 420 is, for example, a linear regulator, that is to say, an LDO (Low Drop Output). The power supply circuit 420 may be constituted by a DC/DC converter.

The overvoltage detecting circuit 430 compares the rectified voltage $V_{RECT}$ of the RECT pin with the overvoltage threshold $V_{OVP}$ and asserts (for example, high level) an overvoltage detection signal $S_{OVP}$ upon detecting an overvoltage state of $V_{RECT} > V_{OVP}$. The overvoltage detecting circuit 430 corresponds to the overvoltage detecting circuit 316 in FIG. 2.

The A/D converter 460 converts each detection value of the rectified voltage $V_{RECT}$ of the RECT pin, the output voltage $V_{OUT}$ of the OUT pin, and the load current $I_{LOAD}$ flowing in the power supply circuit 420 into a digital signal. The digital signal is input to the main controller 440.

The transistors $M_{21}$ and $M_{22}$ together with capacitors $C_{21}$ and $C_{22}$ constitute a modulator (the modulator 310 in FIG. 2). The capacitor $C_{21}$ is interposed between a communication pin COM1 and one end (AC1 pin) of the receiving antenna 301 and the capacitor $C_{22}$ is interposed between a communication pin COM2 and the other end (AC2 pin) of the receiving antenna 301. By switching the transistors $M_{21}$ and $M_{22}$ in response to a packet to be transmitted, the parallel resonance frequency of the receiving antenna 301 is changed and an AM-modulated signal is transmitted from the receiving antenna 301.

The discharging circuit 330 is connected to the RECT pin, that is to say, one end of the smoothing capacitor 306. The discharging circuit 330 can be switched between an enable state and a disable state and discharges the smoothing capacitor 306 in the enable state.

The discharging circuit 330 includes, for example, but not limited to, a discharge transistor 332 and a discharge resistor 334 connected in series. Fixed ON or intermittent ON of the discharge transistor 332 corresponds to the enable state of the discharging circuit 330. In the enable state of the discharging circuit 330, the smoothing capacitor 306 is discharged according to a time constant determined by the capacitance of the smoothing capacitor 306 and the resistance of the discharging circuit 330. Therefore, the resistance of the discharge resistor 334 may be determined so as to obtain an appropriate discharge speed. Specifically, it may be determined such that the rectified voltage $V_{RECT}$ does not exceed the overvoltage threshold $V_{OVP}$ due to communication by the modulator. For example, the resistance of the discharge resistor 334 can be on the order of several tens Ω to several hundred Ω, specifically, about 50 to 300Ω. Thus, it is possible to suppress jumping-up of the rectified voltage $V_{RECT}$ while suppressing wasteful power consumption.

The transistors $M_{31}$ and $M_{32}$ and external capacitors $C_{31}$ and $C_{32}$ form a clamp circuit. This clamp circuit is used to eliminate the overvoltage state. When the overvoltage detection signal $S_{OVP}$ is asserted, the main controller 440 asserts (high level) a control signal $S_{11}$ to turn on the transistors $M_{31}$ and $M_{32}$. As a result, the parallel resonance frequency of the receiving antenna 301 is shifted to a non-tuned state, a current supplied from the rectifying circuit 410 to the smoothing capacitor 306 decreases to suppress the increase of the rectified voltage $V_{RECT}$.

The main controller 440 compares the rectified voltage $V_{RECT}$ converted into the digital value by the A/D converter 460 with the sub-threshold $V_{TH}$ and performs the determination in step S104 in FIG. 5. In addition, the main controller 440 compares the desired point (DP) with the rectified voltage $V_{RECT}$, generates a CE (Control Error) packet so that the rectified voltage $V_{RECT}$ approaches the DP, and modulates the transistors $M_{21}$ and $M_{22}$ of the modulator. By using a conventional built-in A/D converter for generation of the CE packet to perform step S104 in FIG. 5, a voltage comparator for the comparison in step S104 becomes unnecessary, thereby reducing the circuit area.

The main controller 440 is connected to a control terminal (gate) of the discharge transistor 332 of the discharging circuit 330 via a control pin (IO). The main controller 440 outputs a pulsed or high level control signal $S_{20}$ from the IO pin to the gate of the discharge transistor 332 to switch or constantly turn on the discharge transistor 332, enabling the discharging circuit 330.

The above is a configuration example of the reception control IC 400. According to the reception control IC 400, the operation of the power receiver 300 can be stabilized.

(Applications)

Figure 7:
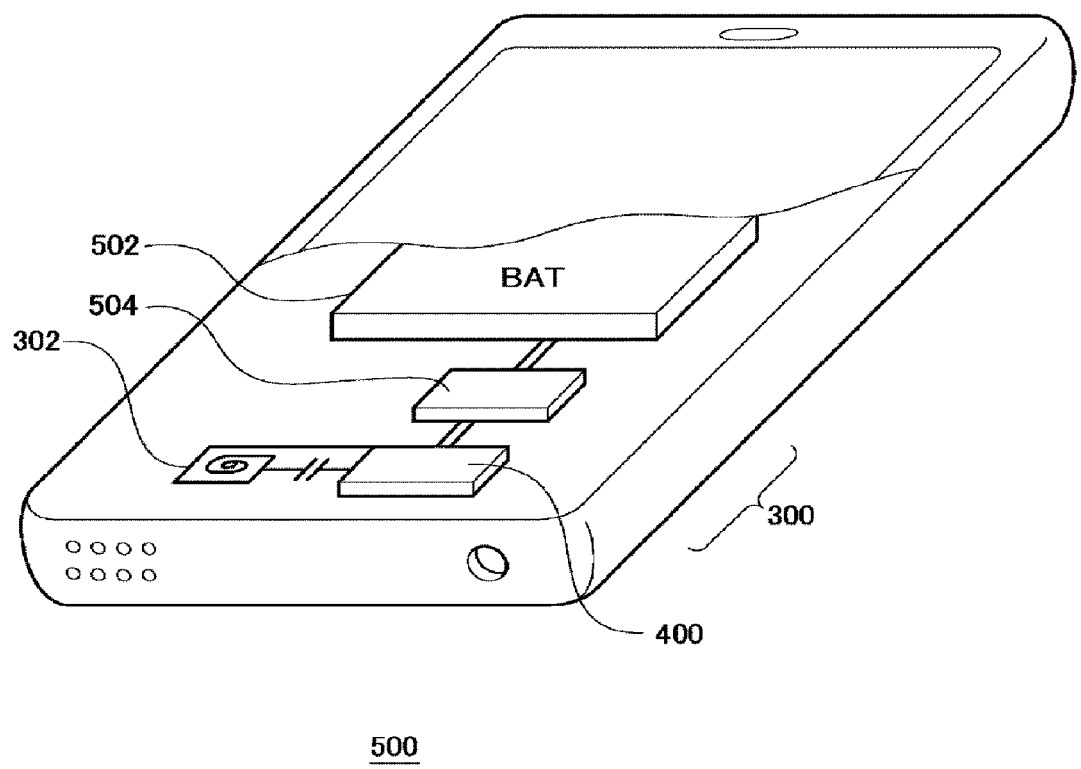
FIG. 7 is a perspective view of an electronic apparatus including the power receiver.

The use of the power receiver 300 will be described. FIG. 7 is a perspective view of an electronic apparatus 500 including the power receiver 300. The electronic apparatus 500 is a battery-driven device such as a mobile phone terminal, a laptop computer, a smart phone, a tablet terminal, a portable audio player, a digital camera, a digital video camera or the like. The electronic apparatus 500 includes a rechargeable battery 502 and a charging circuit 504 in addition to the power receiver 300. The charging circuit 504 receives the output voltage $V_{OUT}$ generated by the power receiver 300 and charges the battery 502.

The present disclosure has been described above by way of embodiments. The disclosed embodiments are illustrated only. It should be understood by those skilled in the art that various modifications to combinations of elements or processes may be made and such modifications fall within the scope of the present disclosure. Such modifications will be described below.

(First Modification)

In the embodiment, the pulsed discharge current $I_{DIS}$ is generated in the enable state of the discharging circuit 330 during the communication period. However, a DC discharge current $I_{DIS}$ may be generated instead of the pulsed discharge current. In this case, in the flowchart of FIG. 5, both the discharge current $I_{DIS}$ in step S108 and the discharge current $I_{DIS}$ in step S106 are DC currents. However, in this case, the current amount in step S108 may be larger than the current amount in step S106.

In the enable state of the discharging circuit 330 during the communication period, in the case of generating the pulsed discharge current $I_{DIS}$, the discharge current $I_{DIS}$ may be switched with a predetermined delay time (phase difference) with respect to the switching of the modulator. In this case, the jumping-up of the rectified voltage $V_{RECT}$ can be further reduced by optimizing the delay time.

(Second Modification)

The configuration of the discharging circuit 330 is not limited to that shown in FIG. 6. For example, when the ON resistance of the discharge transistor 332 can be appropriately designed, the discharge resistor 334 may be omitted. Alternatively, the discharging circuit 330 may be constituted by a constant current source that can be switched between on and off.

(Third Modification)

In the embodiment, the wireless power transmitter in compliance with the Qi standard has been described. However, the present disclosure is not limited thereto but may be applied to a power receiver 300 in compliance with the PMA standard or a standard that will be formulated in the future.

(Fourth Modification)

It is shown in FIG. 6 that the main controller 440 controls both the modulator 310 (the transistors $M_{21}$ and $M_{22}$) and the discharging circuit 330 (the discharge transistor 332). However, the present disclosure is not limited thereto, but the modulator 310 and the discharging circuit 330 may be controlled by other hardware.

(Fifth Modification)

In the power receiver 300 of FIG. 6, the overvoltage protection is applied by the clamp circuit $M_{31}$, $M_{32}$, $C_{31}$ and $C_{32}$ when the overvoltage state is detected. However, an overvoltage protection method is not particularly limited.

(Sixth Modification)

The assignment of the high level and the low level of each signal described in the embodiment is merely an example and can be easily changed by those skilled in the art.

According to the present disclosure in some embodiments, it is possible to stabilize the operation of the wireless power receiver.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A power receiving control circuit for use in a wireless power receiver, comprising:
   a first AC input pin and a second AC input pin connected to a receiving antenna that receives a power signal from a wireless power transmitter;
   a rectification pin to which a smoothing capacitor is externally attached;
   a rectifying circuit having an input side connected to the first AC input pin and the second AC input pin and an output side connected to the rectification pin;

an overvoltage detecting circuit configured to compare a rectified voltage of the rectification pin with an overvoltage threshold;

a first communication pin connected to one end of the receiving antenna via an external capacitor;

a second communication pin connected to the other end of the receiving antenna via another external capacitor;

a first modulation transistor interposed between the first communication pin and a ground;

a second modulation transistor interposed between second communication pin and the ground; and a main controller configured to switch the first modulation transistor and the second modulation transistor so as to transmit a packet from the receiving antenna to the wireless power transmitter and configured to operate, in a transmission period of the packet, a discharging circuit interposed between the rectification pin and the ground so as to discharge the smoothing capacitor connected to the rectification pin.

2. The power receiving control circuit of claim 1, wherein the discharging circuit includes a discharge transistor installed outside the power receiving control circuit, and
wherein the power receiving control circuit further includes a control pin connected to a control terminal of the discharge transistor.

3. The power receiving control circuit of claim 1, wherein a discharge transistor constituting the discharging circuit is incorporated in the power receiving control circuit.

4. The power receiving control circuit of claim 2, wherein the discharging circuit includes a discharge resistor interposed between the rectification pin and the ground and connected in series with the discharge transistor.

5. The power receiving control circuit of claim 2, wherein the main controller switches the discharge transistor in an operation period of the discharging circuit.

6. The power receiving control circuit of claim 5, wherein the main controller constantly turns on the discharge transistor when the rectified voltage exceeds a sub-threshold lower than the overvoltage threshold during the transmission period of the packet.

7. The power receiving control circuit of claim 6, further comprising an A/D converter configured to convert the rectified voltage into a digital value,
wherein the main controller compares the digital value from the A/D converter with the sub-threshold.

8. The power receiving control circuit of claim 1, further comprising a power supply circuit configured to receive the rectified voltage of the rectification pin,
wherein the main controller causes the discharging circuit to enter a disable state when a current flowing through the power supply circuit is larger than a predetermined threshold.

* * * * *